(12) United States Patent
Son et al.

(10) Patent No.: US 7,755,313 B2
(45) Date of Patent: Jul. 13, 2010

(54) POWER INVERTER MODULE THERMAL MANAGEMENT

(75) Inventors: Yo Chan Son, Torrance, CA (US); Gabriel Gallegos-Lopez, Torrance, CA (US); Silva Hiti, Redondo Beach, CA (US); Michael Milani, San Pedro, CA (US); Milun Perisic, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 338 days.

(21) Appl. No.: 11/853,862

(22) Filed: Sep. 12, 2007

(65) Prior Publication Data

US 2009/0072770 A1 Mar. 19, 2009

(51) Int. Cl.
*H02P 7/00* (2006.01)
(52) U.S. Cl. .................. 318/432; 318/471
(58) Field of Classification Search .......... 318/432, 318/434, 638, 471
See application file for complete search history.

(56) References Cited

U.S. PATENT DOCUMENTS

| 5,197,293 | A  | * | 3/1993 | Okamura et al. | ......... | 62/228.4 |
| 5,992,059 | A  | * | 11/1999 | Bettenga et al. | ......... | 36/134 |
| 6,291,958 | B1 | * | 9/2001 | Amey et al. | ......... | 318/471 |
| 2007/0252548 | A1 | * | 11/2007 | Moon et al. | ......... | 318/434 |

OTHER PUBLICATIONS

Blasko, V. et al. "On Line Thermal Model and Thermal Management Strategy of a Three Phase Voltage Source Inverter," IEEE Industry Applications Society, 1999, pp. 1423-1431.
Murdock, D.A. et al. "Active Thermal Control of Power Electronics Modules," IEEE Industry Applications Conference, 2003, pp. 1511-1515, vol. 3.
Chung, D. et al. "Minimum-Loss Strategy for Three-Phase PWM Rectifier," IEEE Transactions on Industrial Electronics, Jun. 1999, pp. 517-526, vol. 46, No. 3.
Murdock, D.A. et al. "Active Thermal Control of Power Electronic Modules," IEEE Transactions on Industry Applications, 2006, pp. 552-558, vol. 42, No. 2.

* cited by examiner

*Primary Examiner*—Rina I Duda
(74) *Attorney, Agent, or Firm*—Ingrassia Fisher & Lorenz, P.C.

(57) ABSTRACT

According to an example embodiment, a method is provided for limiting an operational temperature of a motor. The method includes generating a maximum allowable current $I^*_{S(max)}$ for a motor based on a temperature difference between a temperature reference $T^*$ of a power inverter module and a semiconductor device temperature $T$ of the power inverter module. The method further includes generating a maximum allowable torque $T^*_{e(max)}$ based on the maximum allowable current $I^*_{S(max)}$ and a maximum allowable flux $\Psi^*_{S(max)}$, and using the maximum allowable torque $T^*_{e(max)}$ to limit the torque command $T^*_e$ in order to suppress the semiconductor device temperature $T$ to below the temperature reference $T^*$.

19 Claims, 7 Drawing Sheets

POWER INVERTER MODULE THERMAL MANAGEMENT

TECHNICAL FIELD

This disclosure relates generally to electric motors, and more particularly relates to thermal management of a Power Inverter Module (PIM) for an electrical motor.

BACKGROUND OF THE INVENTION

In recent years, advances in technology, as well as ever evolving tastes in style, have led to substantial changes in the design of automobiles. One of the changes involves the complexity, as well as the power usage, of the various electrical systems within automobiles, particularly alternative fuel vehicles, such as hybrid, electric, and fuel cell vehicles.

The power and/or torque density required for motors used in such vehicles is extremely high. The amount of power or torque that can be generated by a particular motor is limited in large part by the winding, or coil, temperature within the motor during operation. If the motor is permitted to operate such that the winding temperature becomes too high, sensitive electrical components, such as semiconductor devices of the PIM, may be damaged.

One commonly used method of limiting PIM temperature is to calculate I2T (current to temperature) of output or DC current and to limit the duration of the peak current, which is fixed proportional to the nominal current of the specification. However, this approach does not consider the heating mechanism inside the PIM, and works in a completely open-loop manner.

Accordingly, it is desirable to provide a system and method for limiting the operating temperature of an electric motor that allows the operational temperature to be continuously controlled at various stages of operation. In addition, it is desirable to provide a system and method that facilitates continuous operation of the motor while limiting the operating temperature. Furthermore, other desirable features and characteristics of the present invention will become apparent from the subsequent detailed description and the appended claims, taken in conjunction with the accompanying drawings and the foregoing technical field and background.

SUMMARY OF THE INVENTION

According to various exemplary embodiments, a method is provided for limiting an operational temperature of a motor. The method includes generating a maximum allowable current $I^*_{S(max)}$ for a motor based on a temperature difference between a temperature reference T* of a power inverter module and a semiconductor device temperature T of the power inverter module. The method further includes generating a maximum allowable torque $T^*_{e(max)}$ based on the maximum allowable current $I^*_{S(max)}$ and a maximum allowable flux $\Psi^*_{S(max)}$, and using the maximum allowable torque $T^*_{e(max)}$ to limit the torque command $T^*_e$ in order to suppress the semiconductor device temperature T to below the temperature reference T*.

According to other exemplary embodiments, a controller operable to limit a temperature of a power inverter module in an automotive system is provided. The controller includes a temperature error circuit operable to provide a difference between a temperature reference for the power inverter module and a temperature of the power inverter module at an output of the temperature error circuit, and a Proportional Integrator (PI) controller circuit coupled to the output of the temperature error circuit, the PI controller circuit operable to provide a current reference $I_{S(fb)}$ based at least in part upon the difference.

According to various other exemplary embodiments, an automotive system is provided. The automotive system suitably includes a motor and a power inverter module coupled to the motor. The automotive system further includes a controller coupled to the motor and torque limiter coupled to the controller. The controller is operable to generate a maximum allowable current $I^*_{S(max)}$ for the motor based on a difference between a temperature limit T* for the power inverter module and a semiconductor device temperature T of the power inverter module. The torque limiter is operable to limit a torque command for the motor based upon the maximum allowable current $I^*_{S(max)}$.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-11 are merely illustrative and may not be drawn to scale.

FIG. 1 to FIG. 11 illustrate a method and/or system for limiting the operating temperature of an electric motor. According to one aspect, a maximum allowable current $I^*_{S(max)}$ of the motor is generated based on the temperature difference between the junction temperature reference (or limit) $T^*_j$ and the real (either measured or estimated) junction temperature $T_j$. According to another aspect, the maximum allowable current $I^*_{S(max)}$ of the motor is generated based on the temperature difference between the substrate temperature reference (or limit) $T^*_s$ and the real (either measured or estimated) substrate temperature $T_s$. The maximum allowable current $I^*_{S(max)}$ of the motor is then converted to a torque limit that is used to limit the torque command of the motor.

Figure 1:
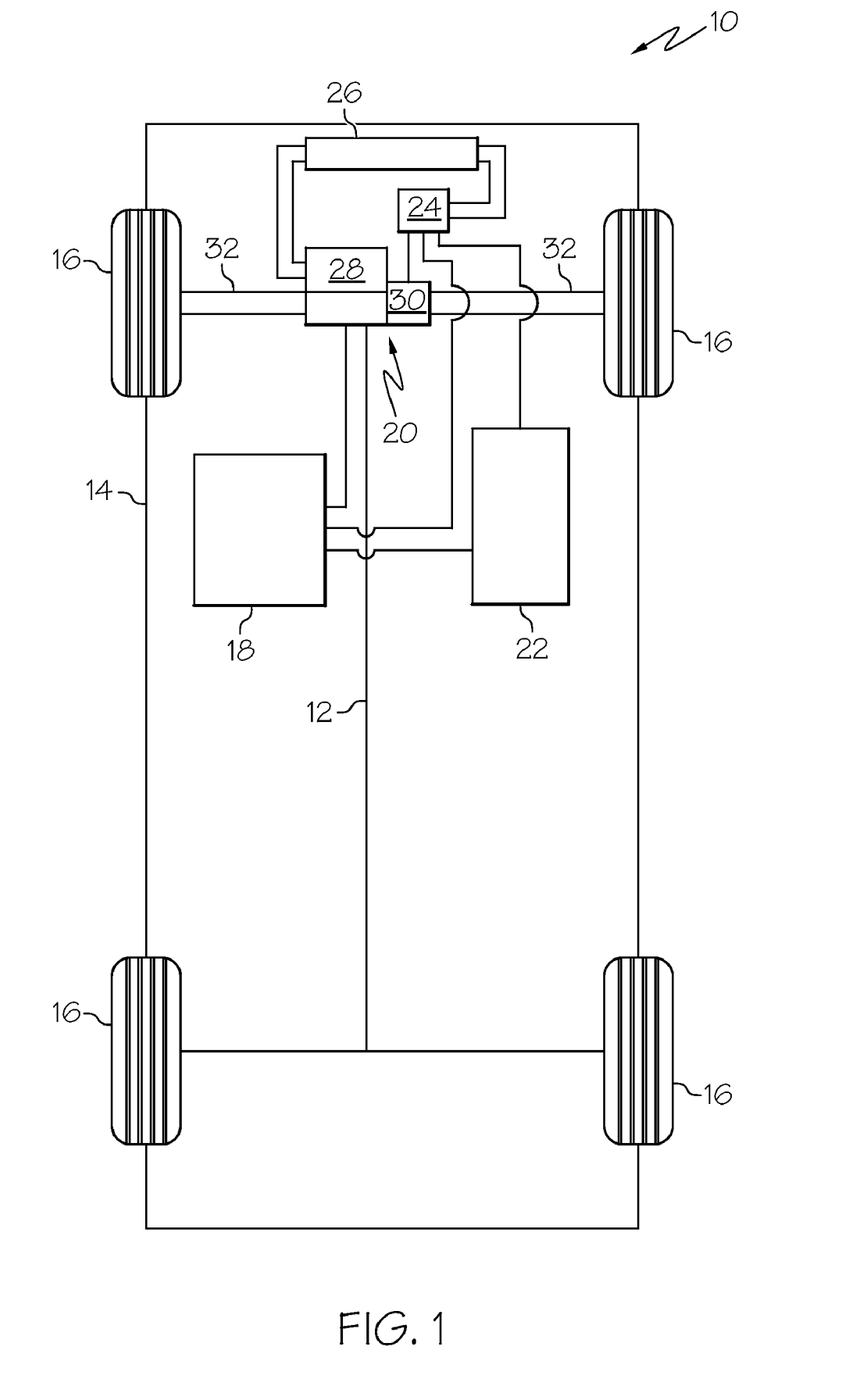
FIG. 1 is a schematic view of an exemplary automobile according to an embodiment of the invention.

FIG. 1 illustrates a vehicle 10, or "automobile", according to one embodiment. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the automobile 10 is a hybrid vehicle, and further includes an actuator assembly 20, a battery 22, a PIM assembly 24, and a radiator 26. The actuator assembly 20 includes a combustion engine 28 and an electric motor/generator (or motor) 30. As will be appreciated by one skilled in the art, the electric motor 30 includes a transmission therein, and although not illustrated also includes a stator assembly (including a plurality of conductive coils), a rotor assembly (including a ferromagnetic core), a cooling fluid (i.e., coolant), and at least one temperature sensor therein. The combustion engine 28 and the electric motor 30 are integrated such that both are mechanically coupled to at least some of the wheels 16 through one or more drive shafts 32. The radiator 26 is connected to the frame at an outer portion thereof and although not illustrated in detail, includes multiple cooling channels therethough that contain a cooling fluid (i.e., coolant) such as water and/or ethylene glycol (i.e., "antifreeze) and is coupled to the engine 28 and the PIM assembly 24. In one embodiment, the PIM assembly 24 receives and shares coolant with the electric motor 30. The radiator 26 may be similarly connected to the PIM assembly 24 and/or the electric motor 30.

The electronic control system 18 is in operable communication with the actuator assembly 20 (including the temperature sensors therein), the battery 22, and the PIM assembly 24. Although not shown in detail, the electronic control system 18 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

During operation, still referring to FIG. 1, the vehicle 10 is operated by providing power to the wheels 16 with the combustion engine 28 and the electric motor 30 in an alternating manner and/or with the combustion engine 28 and the electric motor 30 simultaneously. In order to power the electric motor 30, direct current (DC) power is provided from the battery 22 to the PIM assembly 24, which converts the DC power into alternating current (AC) power, before the power is sent to the electric motor 30.

Figure 2:
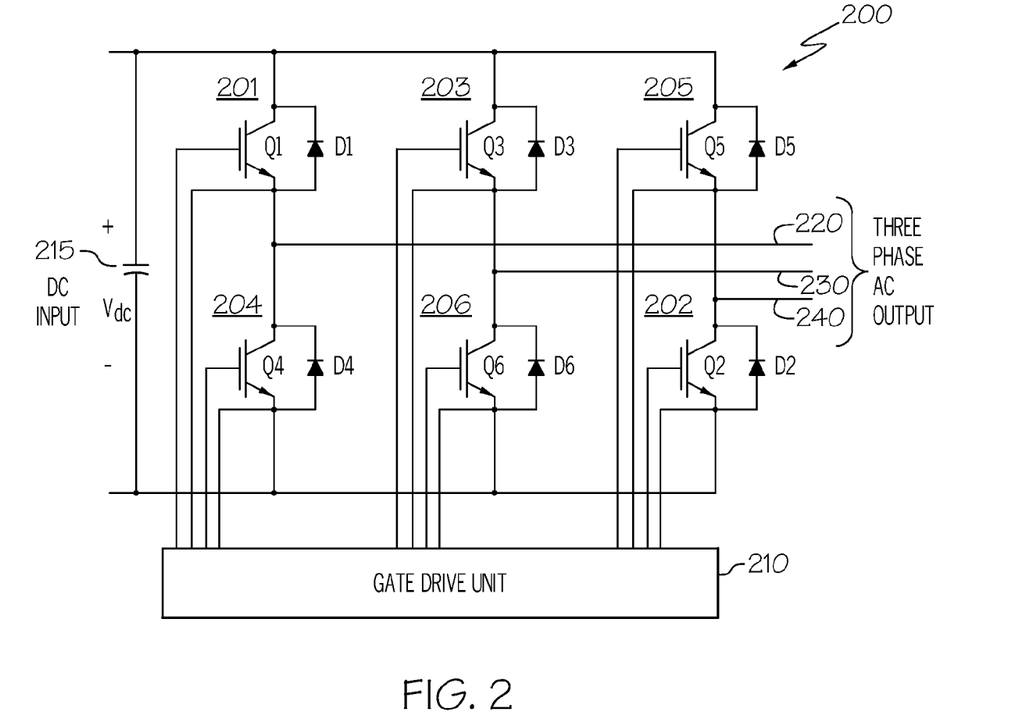
FIG. 2 is a block diagram illustrating an exemplary PIM according to an embodiment of the invention.

FIG. 2 is a block diagram illustrating an exemplary PIM 200 according to an embodiment. The PIM 200 suitably includes a gate drive unit 210 and six pairs of parallel-connected insulated bipolar transistors (IGBT) and diodes 201-206, where pair 201 includes IGBT Q1 and diode D1, pair 202 include IGBT Q2 and diode D2, pair 203 includes IGBT Q3 and diode D3, etc. Each IGBT and diode can represent a single silicon chip or the parallel connection of multiple chips.

The gates of the IGBTs Q1-Q6 are coupled to the gate drive unit 210, which controls the operation of the IGBTs. Each of the six IGBT-diode pairs 201-206 is serially connected with another one of the six pairs across a positive supply voltage and a negative supply voltage provided by the battery 22, which constitutes the DC input voltage Vdc for the PIM 200. Each IGBT-diode pair 201-206 becomes a switch for the motor control, and the nodes 220, 230, 240 between the serially-connected IGBT-diode pairs together provide a three-phase AC output voltage. The PIM 200 also includes a capacitor 215 connected across the DC input voltage $V_{DC}$.

Other embodiments may utilize other PIM designs. For example, in some applications Metal-Oxide-Semiconductor Field Effect Transistors (MOSFETs) may be used in place of the IGBT-diode pairs 201-206.

Figure 3:
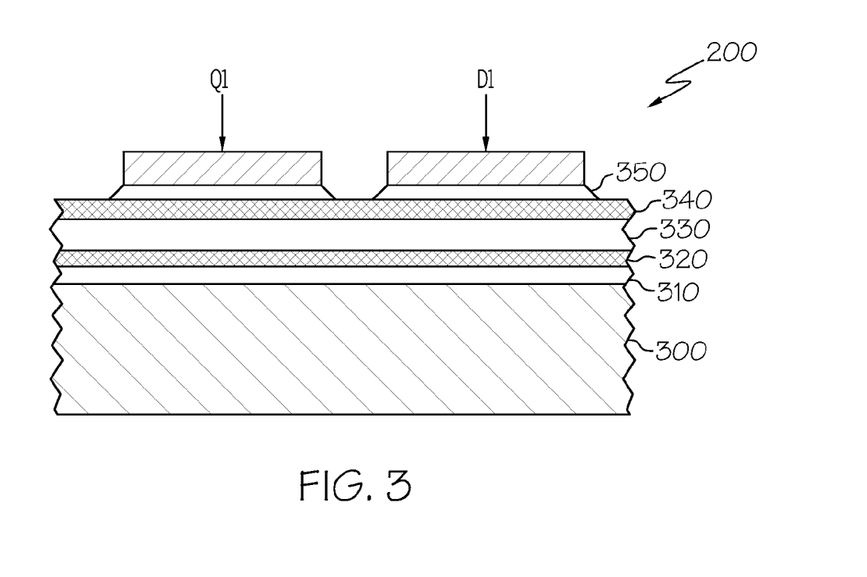
FIG. 3 is a schematic diagram further illustrating the construction of the PIM of FIG. 2 according to an embodiment of the invention.

FIG. 3 is a schematic diagram further illustrating the construction of the PIM 200 of FIG. 2 according to an embodiment. The silicon chip or silicon chips of the PIM 200 may be attached to a circuit board like the direct copper bonded substrate illustrated in FIG. 3. Alternatively, the silicon chip or silicon chips may be attached to a lead frame with insulation material or to an insulated metal substrate having a similar configuration.

FIG. 3 illustrates that the IGBT Q1 and diode D1 are bonded with solder layer 350 to a copper layer 340. An insulation layer 330 is disposed between the copper layer 340 and another copper layer 320, which is thermally coupled to a heatsink 300 by a thermal contact 310.

The current or power rating of the PIM 200 is limited by the maximum temperature of the silicon junction during operation, which is a function of the power dissipation and the thermal impedance where they are attached. Each IGBT-diode pair 201-206 experiences a conduction loss when the pair is turned on and a switching loss during the transition between the on and off states. These losses that are generated in the silicon chips are transferred through the layers shown in FIG. 3. Each layer 300-350 illustrated in FIG. 3 has a finite thermal impedance which causes a temperature difference between the layers when any power dissipation occurs.

Since each switch of FIG. 2 should be electrically isolated from the outside world, the insulation layer 330 represents a significant portion of thermal impedance of the PIM 200. The heat sink 300 in FIG. 3 interfaces the PIM with the ambient coolant, which may be air, water, oil, etc., and represents another large portion of the thermal impedance in the thermal system. The copper layers 320, 340 and solder layer 350, as well as the silicon of the IGBTs Q1-Q6 and diodes D1-D6 have much less thermal impedance than the insulation layer 330. For simplicity, the chip temperature may be considered equivalent to the junction temperature $T_j$, the substrate temperature may be considered equivalent to the temperature at the bottom side of the heat sink 300. The substrate may be considered to be the combination of the solder layer 350, the copper layer 340, the insulation layer 330, and the copper layer 320, which may be modeled as a single piece of thermal impedance. Similarly, the thermal contact 310, which may be thermal grease or a thermal pad with relatively low thermal impedance, may be regarded as being part of the heatsink 300.

Figure 4:
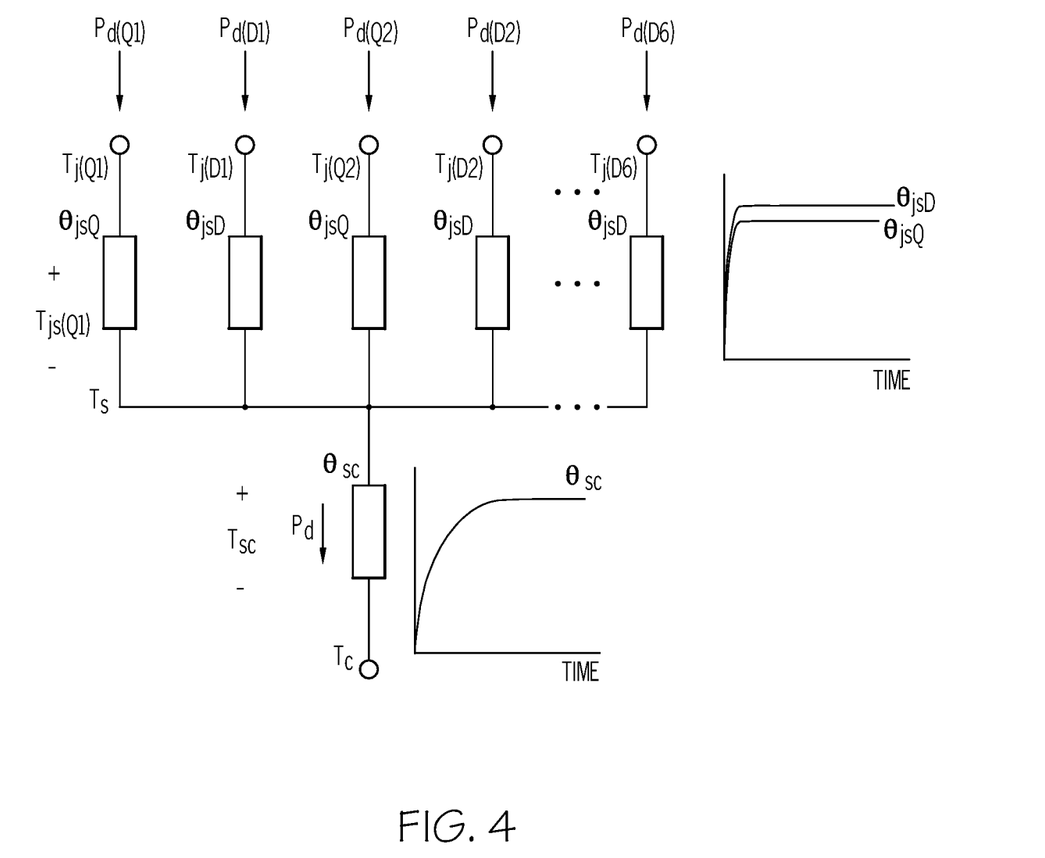
FIG. 4 is a block diagram illustrating an equivalent thermal model of the PIM of FIGS. 2 and 3.

FIG. 4 is a block diagram illustrating the equivalent thermal model of the PIM 200 of FIGS. 2 and 3. It is assumed that the substrate temperature is uniform, and there is no direct thermal interaction between the switches 201-206. If there are multiple chips used to implement the switches 201-206, then it can be considered a lumped element assuming the even distribution of power dissipation. For instance, the thermal impedance of IGBT Q1 in FIG. 2 may be defined by the relationship between the power dissipation and the temperature difference as equation (1).

$$\Delta T_{js(Q1)} = T_{j(Q1)} - T_s = T_{jsQ} * P_{d(Q1)} \quad (1)$$

In equation (1), the subscript "j" stands for the junction, the subscript "s" stands for the substrate, $P_{d(Q1)}$ represents the power dissipation of Q1, $T_{jsQ}$ is the thermal impedance, and * is the convolution operator. After Laplace transformation of equation (1), the thermal impedance $T_{jsQ}$ is typically represented as a first-order lag system as shown in equation (2).

$$T_{jsQ} = \Delta T_{js(Q1)} / P_{d(Q1)} = R_{\theta jsQ} / (t_{jsQ} s + 1) \quad (2)$$

In equation (2), $t_{jsQ}$ is the thermal time constant, s is the Laplace operator, and $R_{\theta jsQ}$ is the thermal resistance, or the thermal impedance at the steady state. The thermal impedance between the substrate and the ambient material is similarly defined in equation (3).

$$T_{sc} = \Delta T_{sc} / P_d = R_{\theta sc} / (t_{sc} s + 1) \quad (3)$$

In equation (3), the subscript "c" refers to the coolant and $P_d$ is the total power dissipation delivered to the heatsink. Assuming that all IGBT-diode pairs 201-206 are attached to the same heatsink, the junction temperature of Q1 may then be calculated with equation (4), which is obtained from equations (1)-(3).

$$\begin{aligned} T_{j(Q1)} &= \Delta T_{js(Q1)} + T_s \\ &= T_{jsQ} * P_{d(Q1)} + T_s \\ &= \Delta T_{js(Q1)} + \Delta T_{sc} + T_c \\ &= T_{jsQ} * P_{d(Q1)} + T_{sc} * P_d + T_c \end{aligned} \quad (4)$$

In equation (4), $\Delta T_{sc} = T_s - T_c$, where $T_c$ is the ambient temperature of the system, and which in automotive applications is the coolant temperature. From equation (4), if the junction temperature $T_{j(Q1)}$ is measurable, it is possible to control the junction temperature by adjusting its self-dissipation $P_{d(Q1)}$ as well as the total power dissipation $P_d$.

In most practical cases, it is difficult to measure the junction temperature directly unless there is a built-in temperature sensor on the silicon chip. However, in automotive applications the ambient temperature $T_c$ is measured for other purposes, and if there is enough knowledge of the power dissipation of the thermal system, it may be used to estimate the junction temperature in equation (4). At extremely low speeds of the motor, the power dissipations from each switch may not be balanced. In this case, it would be appropriate to build a thermal model of each switch to generate its temperature, and then take the maximum value to limit the maximum junction temperature inside the module. Hereafter, it is assumed that the power dissipation of each switch in FIG. 2 is balanced, and that the IGBT temperature is controlled. As was shown by D. W. Chung et al. ("Minimum-loss strategy for three-phase PWM rectifier," IEEE Trans. Ind. Electronics., vol. 46, no. 3, June 1999, pp. 517-526), the power dissipation of each chip may be calculated from equations (5)-(12), where it is assumed that the PIM is operating in a balanced manner, with power dissipation evenly generated from each chip.

$$P_{con(Q)} = \frac{V_T}{2\pi}\left(1 + \frac{\pi}{4} \cdot MI \cdot \cos\phi\right)I_S + \frac{R_T}{8}\left(1 + \frac{8}{3\pi} \cdot MI \cdot \cos\phi\right)I_S^2 \quad (5)$$

$$P_{con(D)} = \frac{V_D}{2\pi}\left(1 - \frac{\pi}{4} \cdot MI \cdot \cos\phi\right)I_S + \frac{R_D}{8}\left(1 - \frac{8}{3\pi} \cdot MI \cdot \cos\phi\right)I_S^2 \quad (6)$$

$$P_{sw(Q)}|_{SVPWM} = E_{sw(Q)} \cdot f_{sw} \cdot \frac{I_S}{I_{spec}} \cdot \frac{V_{dc}}{V_{spec}} \quad (7)$$

$$P_{sw(D)}|_{SVPWM} = E_{sw(D)} \cdot f_{sw} \cdot \frac{I_S}{I_{spec}} \cdot \frac{V_{dc}}{V_{spec}} \quad (8)$$

$$P_{sw} = \alpha_{PWM} \cdot P_{sw}|_{SVPWM} \quad (9)$$

$$P_{d(Q)} = P_{con(Q)} + P_{sw(Q)} \quad (10)$$

$$P_{d(D)} = P_{con(D)} + P_{sw(D)} \quad (11)$$

$$P_d = 6(P_{d(Q)} + P_{d(D)}) \quad (12)$$

Equations (5) and (6) calculate the conduction losses of the IGBT and the diode, respectively, and the effect of the modulation method is ignored. In equations (5) and (6), $I_S$ is the peak amplitude of the sinusoidal motor current. In equation (5), $V_T$ and $R_T$ are parameters of the $1^{st}$-order model of IGBT voltage drop as a function of the device current (phase current when it is conducting), and MI is the modulation index normalized by half of the DC supply voltage, $V_{DC}$. Similarly, in equation (6), $V_D$ and $R_D$ are parameters of the $1^{st}$-order model of diode voltage drop as a function of the device current (phase current when it is conducting), and MI is the modulation index normalized by $V_{DC}/2$.

Equations (7) and (8) calculate the switching losses of the IGBT and the diode, respectively. In equations (7) and (8), $I_S$ is the peak amplitude of the sinusoidal motor current, $E_{SW(Q)}$ and $E_{SW(D)}$ is the sum of energy dissipated during on and off transitions by the IGBT and the diode, respectively, at given phase current $I_{spec}$ and given DC bus voltage $V_{spec}$. It is assumed that continuous, Single Value Pulse Width Modulation (SVPWM) is used with the switching frequency $f_{SW}$. It can be seen from equations (7) and (8) that the switching losses are proportional to the phase current $I_S$ and the DC supply voltage $V_{DC}$.

In cases where discontinuous PWM is used, the switching loss calculated in equations (7) and (8) is scaled according to equation (9), where $0.5 \leq \alpha_{PWM} \leq 1$, indicating reduction of switching loss according to the modulation method. The total power dissipated by each IGBT and diode are given by equations (10) and (11), respectively, while the total power dissipated by the PIM 200 is six times the sum of equations (10) and (11), as shown in equation (12). As was noted above, the power dissipation $P_{d(Q)}$ of equation (10) and the power dissipation $P_{d(D)}$ of equation (11) affect the temperature difference between the silicon junction and the substrate, while the total power dissipation $P_d$ of equation (12) affects the temperature difference between the substrate and the ambient, as noted in equations (1)-(4).

In order to control the temperature of the IGBT or the diode at a given operating condition for the DC bus voltage $V_{DC}$ and operating speed, the operating current $I_S$ may be adjusted. It may also be possible to adjust the switching frequency to achieve the same goal, but it will be restricted in some operating conditions, especially at high speed operation, because it can degrade the control resolution.

Figure 5:
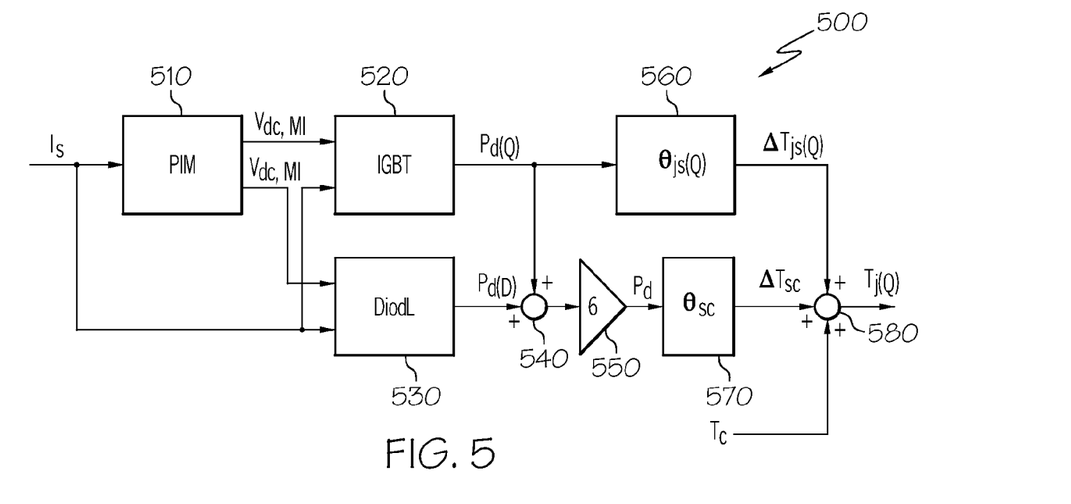
FIG. 5 is a block diagram modeling a plant that utilizes the PIM of FIG. 2.

FIG. 5 is a block diagram modeling a plant 500 that utilizes the PIM of FIG. 2. As illustrated in FIG. 5, the phase current $I_S$ is input to the PIM block 510, as well as to the IGBT block 520 and the Diode block 530. The DC supply voltage $V_{DC}$ and the modulation index MI are operating conditions of the PIM block 510, and are parameters used in equations (5)-(8). Based upon these inputs to the IGBT block 520 and the FRD block 530, the power dissipations $P_{d(Q)}$ and $P_{d(D)}$ may be obtained as indicated in equations (10) and (11). Summing block 540 and gain block 550, which has a gain factor of 6, together implement equation (12) to obtain the total power dissipated $P_d$.

In block 560, the thermal impedance between the junction and the substrate ($T_{jsQ}$) is multiplied by the power dissipated by the IGBT ($P_{d(Q)}$) to calculate the temperature difference between the junction and the substrate ($\Delta T_{jS(Q)}$), as defined in equation (2). Similarly, in block 570, the thermal impedance between the substrate and the coolant ($T_{sc}$) is multiplied with the total power dissipated ($P_d$) to calculate the temperature difference between the substrate and the ambient ($\Delta T_{sc}$), as defined in equation (3). Finally, in summing block 580, the temperature difference between the IGBT junction and the substrate ($\Delta T_{jS(Q)}$), the temperature difference between the substrate and the coolant ($\Delta T_{sc}$), and the coolant temperature $T_c$ are added to obtain the IGBT junction temperature ($T_{j(Q)}$) as defined in equation (4).

Figure 6:
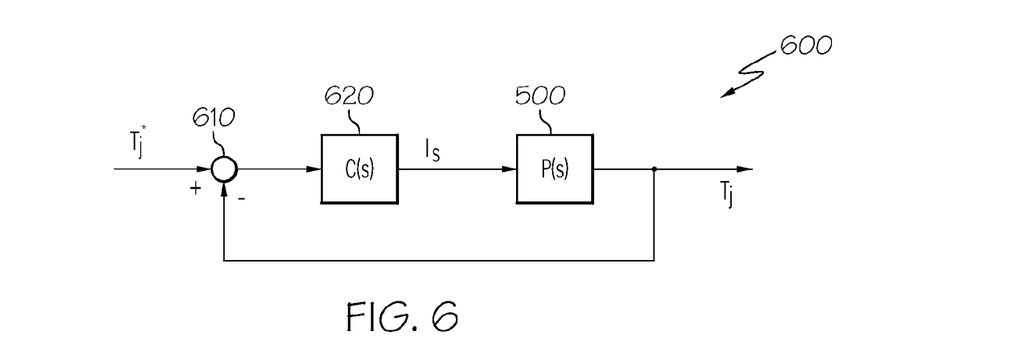
FIG. 6 is a block diagram modeling a plant to be controlled in accordance with an embodiment of the invention.

FIG. 6 is a simplified block diagram modeling a system 600 in accordance with an embodiment of the invention. In FIG. 6, the system 600 includes a difference block 610 and a controller C(s) 620. The system 600 additionally includes the plant P(s) 500 of FIG. 5, which is simplified in FIG. 6 and represented as a single block. The rest of the inputs to the plant 500 in FIG. 5 are treated as parameters, and are not shown in FIG. 6. As illustrated in FIG. 6, the motor current $I_S$ is the input to the plant 500, and the IGBT junction temperature $T_j$ is the output of the plant. The controller 620 is operable to adjust the amount of phase current $I_S$ based on the temperature difference between the IGBT junction temperature reference (or limit) $T^*_j$ and the real IGBT junction temperature $T_j$, which is calculated by the difference block 610.

Since the thermal time constant of the substrate ($t_{jsQ}$) in equation (2) is typically smaller than one second, it is not practical to use this time constant to boost up the inverter rating. Moreover, most of the temperature sensors have slower dynamics than the time constant $t_{jsQ}$, so it can be assumed that that there is no dynamics of substrate, and only the substrate temperature changes slowly according to the time constant of the heat sink. After removing the effect of the substrate time constant, the system 600 of FIG. 6 can be modified as shown in FIG. 7.

Figure 7:
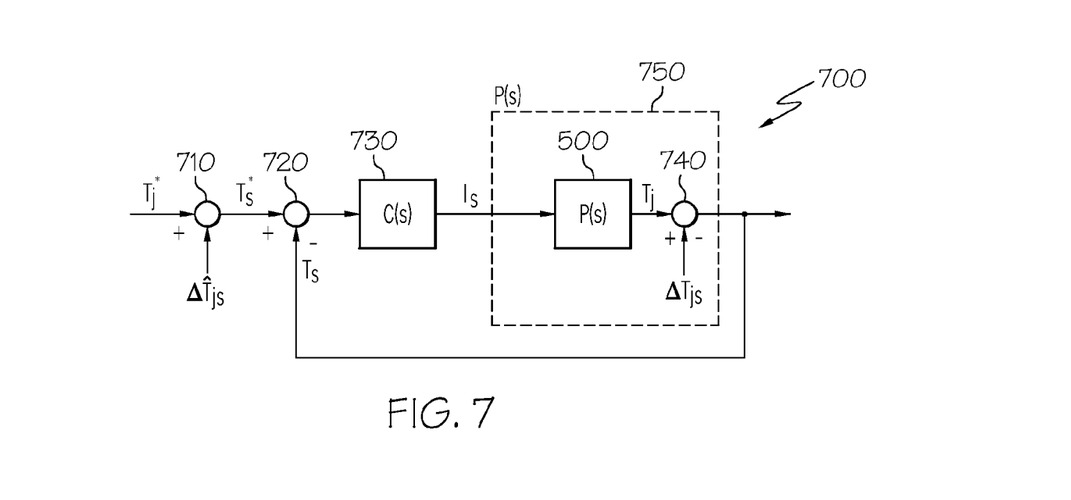
FIG. 7 is a block diagram modeling a system in accordance with an embodiment of the invention.

FIG. 7 is a block diagram modeling a system 700 in accordance with an embodiment of the invention. Like system 600, the system 700 includes the plant P(s) 500 of FIG. 5. System 700 additionally includes controller C(s) 730 and difference junctions 710, 720, and 740. According to this embodiment, the controller 730 is operable to adjust the amount of phase current $I_S$ based on the temperature difference, supplied by the difference junction 720, between the substrate temperature reference (or limit) $T^*_s$ and the measured substrate temperature $T_s$.

The substrate temperature reference $T^*_s$ can be calculated by subtracting, at difference junction 710, the estimated temperature difference $\Delta \hat{T}_{jS(Q1)}$ from the IGBT junction temperature reference $T^*_j$. By neglecting the effect of the thermal time constant ($t_{jsQ}$) of equation (2), the estimated temperature difference $\Delta \hat{T}_{jS(Q1)}$ may be calculated as shown in equation (13).

$$\Delta \hat{T}_{js(Q1)} = R_{\theta jsQ} \cdot P_{d(Q)} \tag{13}$$

The feedback signal, or substrate temperature $T_S$, can be measured from the temperature sensor, which is typically attached to the substrate of the power module for temperature protection. The plant P(s) 500 and the difference junction 740 may be considered a new plant p(s) 750 with the phase current $I_S$ as the input and substrate temperature $T_S$ as the output.

Figure 8:
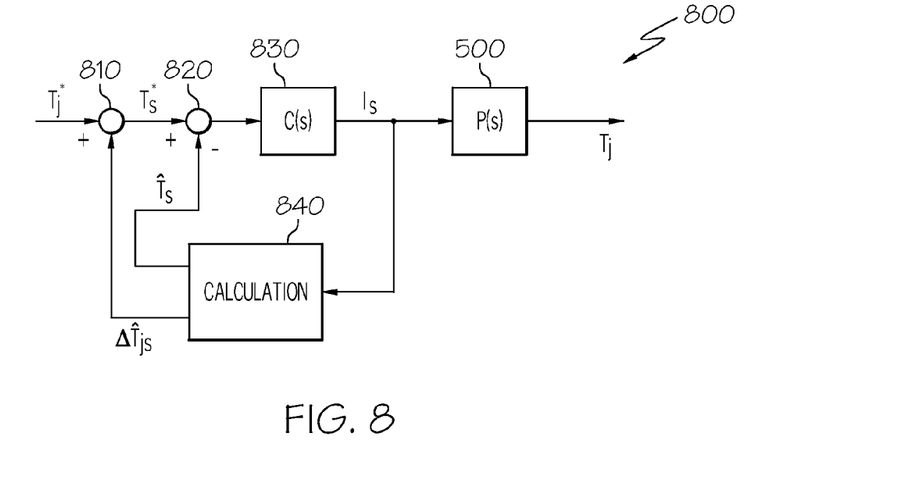
FIG. 8 is a block diagram modeling a system in accordance with an embodiment of the invention.

FIG. 8 is a block diagram modeling a system 800 in accordance with an embodiment of the invention. Like system 600, the system 800 includes the plant P(s) 500 of FIG. 5. System 800 also includes controller C(s) 830, difference junctions 810 and 820, and calculation block 840. According to this embodiment, the controller 830 is operable to adjust the amount of phase current $I_S$ based on the temperature difference, supplied by the difference junction 820, between the substrate temperature reference (or limit) $T^*_s$ and the estimated substrate temperature $\hat{T}_S$. System 800 represents quasi-open-loop control of the junction temperature $T_j$.

The estimated substrate temperature $\hat{T}_S$ may be used in cases where, unlike the embodiment illustrated in FIG. 7, the measured substrate temperature $T_S$ is not available from a temperature sensor that is attached to the substrate. The calculation block 840 is operable to obtain an estimated substrate temperature $\hat{T}_S$ from equations (2)-(12) and the phase current $I_S$. The calculation block 840 is further operable to obtain the estimated temperature difference $\Delta \hat{T}_{jS(Q1)}$ using equation (13). Difference junction 810 has the same function as difference junction 710 in FIG. 7, but difference junction 820 uses the estimated substrate temperature $\hat{T}_S$ rather than the measured substrate temperature $T_S$ that is used by difference junction 720.

When it comes to the design of controllers 730 and 830 that control the substrate temperature, a Proportional Integration (PI) controller may be used, with a gain that is derived as explained below. In order to have a first order response with the finite bandwidth $\omega_c$, the open-loop gain of the system 700 of FIG. 7 should become a first order integrator as shown in equation (14), and the controller C(s) should satisfy the condition of equation (15), where $k_p$ and $k_i$ are the gains of the PI controller.

$$G_o(s) = C(s) \cdot p(s) = \frac{\omega_c}{s} \tag{14}$$

$$C(s) = \frac{\omega_c}{s} \cdot p^{-1}(s) = k_p + \frac{k_i}{s} \tag{15}$$

The plant p(s) is not actually a linear time-invariant system, but a non-linear time-varying system, and it can be calculated from equations (3) and (5)-(12). Assuming that all parameters do not change with small changes in the motor current $I_S$, it is possible to approach this problem using small signal analysis to arrive at equation (16).

$$p(s) = \frac{\partial T_S}{\partial I_S}\bigg|_{\Delta I_S \to 0} = \frac{6R_{\theta sc}}{\tau_{sc}s+1}[(C_{Q1}+C_{D1})+2(C_{Q2}+C_{D2})I_S] = \frac{K(I_S)}{\tau_{sc}s+1} \quad (16)$$

However, parameters such as MI and $\phi$ in equations (5) and (6) are also functions of the phase current $I_S$ by the motor operation, thus equation (16) can be a solution of an iterative equation. By accepting the result of equation (16), then the gains $k_p$ and $k_i$ of the PI controller C(s) in equation (15) are derived as equations (17) and (18).

$$k_p = \frac{\tau_{sc} \cdot \omega_c}{K(I_S)} \quad (17)$$

$$k_i = \frac{\omega_c}{K(I_S)} \quad (18)$$

In equation (16), $C_{Q1}$, $C_{Q2}$, $C_{D1}$, and $C_{D2}$ are coefficient factors of IGBT and diode losses in equations (10) and (11), which can be expressed as equations (19) and (20).

$$P_{d(Q)} = C_{Q1} \cdot I_S + C_{Q2} \cdot I_S^2 \quad (19)$$

$$P_{d(D)} = C_{D1} \cdot I_S + C_{D2} \cdot I_S^2 \quad (20)$$

Thus far, the controller C(s) design has been focused on the IGBT junction temperature control, but for most practical applications the PIM temperature should be restricted below the safety limit rather than controlling it to be the same as the reference. In such cases, the output of the controller C(s) will determine the maximum allowable current limit for the PIM to be operated within the allowable temperature limit $T^*_j$.

Moreover, since the phase current $I_S$ is not directly proportional to the torque depending on the operating speed and the DC bus voltage, the torque command, rather than the phase current $I_S$, should be the input to the motor control algorithm. Therefore, the temperature-limiting controller C(s) should be accommodated for motor control purposes.

For example, in the case of permanent magnet AC motors, the maximum torque at a specific speed is limited by the relation between the DC bus voltage and the amplitude of the Back ElectroMotive Force (BEMF). If BEMF exceeds a certain portion of the DC bus voltage VDC, then the BEMF should be reduced by increasing the demagnetizing current of the motor or by decreasing the motor torque command. This gives the nonlinear relation between the motor torque and current, which can be solved by the two-dimensional table shown in FIG. 9.

Figure 9:
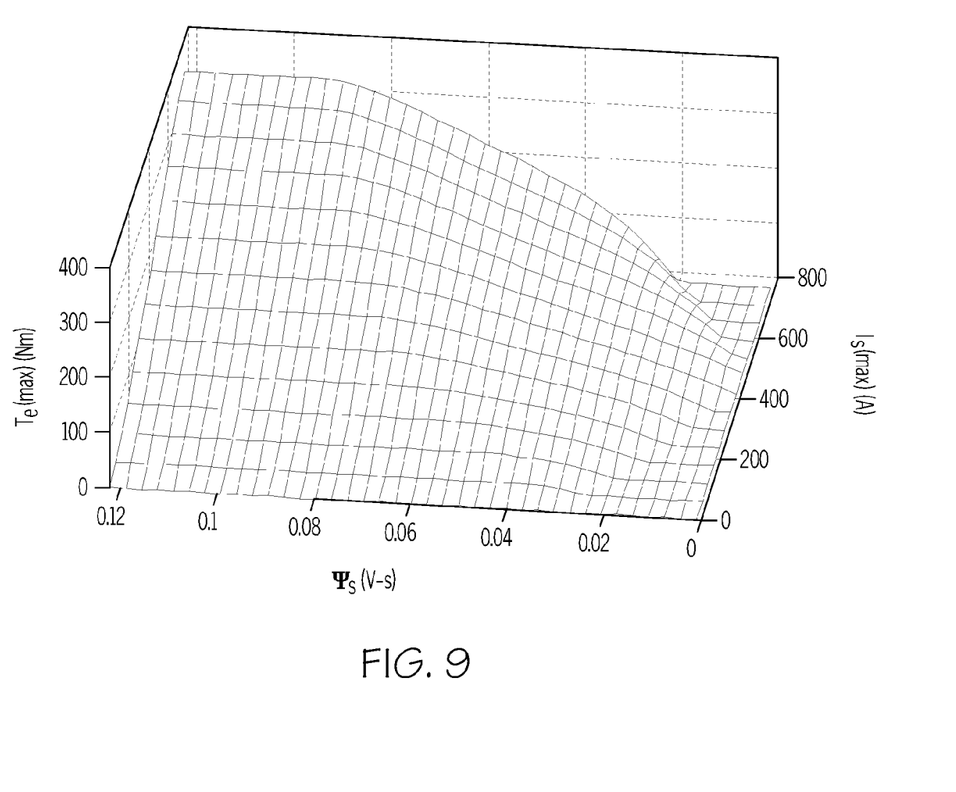
FIG. 9 is a graph illustrating the maximum available torque of an example motor as a function of flux and current.

FIG. 9 is a graph illustrating the maximum available torque of an example motor as a function of flux and current. The graph of FIG. 9 requires two inputs; one is the allowable current limit $I^*_{S(max)}$, in units of Amperes, which may be the output of the temperature-limiting controller C(s). The other input is the maximum allowable flux $\Psi^*_{S(max)}$, in units of Volt seconds, that is defined by the ratio between the DC bus voltage $V_{DC}$ and the operating speed. The output of FIG. 9 is the maximum allowable torque $T^*_{e(max)}$ corresponding to the current limit at the operating condition. Graphs such as FIG. 9 are easily obtainable for a particular motor by measuring the capability of the drive system, or it can be taken by the characterization of the motor for the field weakening operation.

When applying the output $I_S$ of controllers 730, 830 for the PIM temperature limiting purpose, due to stability issues, the control bandwidth $\omega_c$ should not be set higher than the feedback bandwidth of the temperature sensor that is used to measure the substrate temperature $T_S$. Thus, $\omega_c$ is selected between the feedback bandwidth and the cutoff frequency $1/\tau_{sc}$ from equation (3).

As an example, the time constant of a typical thermistor is in the range of about 3 to 5 seconds. If the thermistor is used to measure the substrate temperature $T_S$, then the bandwidth of this controller cannot be higher than 0.2 to 0.3 rad/s, which is quite slow compared with any other controllers in the motor drive system. Therefore, if the output of this controller were used to limit the motor current or the torque command for over-temperature protection, the final torque achieved would follow the dynamics of the temperature controller, which should not be used for automotive applications that should have fast torque control on the order of a few milliseconds to a hundred milliseconds of response time.

In order to speed up the control behavior, a feedforward current term $I_{S(ff)}$ that provides an estimate of the allowable current limit at the steady state should be used. The feedforward current $I_{S(ff)}$ can be calculated by solving the steady-state solution of equations (4), (12), (19), and (20). In the steady state, equation (4) can be rewritten as equation (21).

$$T_{jQ} - T_C = 6R_{\theta sc}(P_D + P_Q) + R_{\theta sc}P_Q \quad (21)$$
$$= [6R_{\theta sc}(C_{Q1}+C_{D1}) + R_{\theta js}C_{Q1}]I_S +$$
$$\quad [6R_{\theta sc}(C_{Q2}+C_{D2}) + R_{\theta js}C_{Q2}]I_S^2$$
$$= \beta_1 I_S + \beta_2 I_S^2$$

Here, $\beta_1$ and $\beta_2$ are functions of operating condition as mentioned above. When the temperature reference $T^*_j = T_{j(Q)}$ is greater than the coolant temperature $T_c$, a unique solution to equation (21) exists as equation (22).

$$I_{S(ff)} = \frac{-\beta_2 + \sqrt{\beta_2^2 + 4\beta_1(T^*_j - T_c)}}{2\beta_1} \quad (22)$$

When adopting the feedforward current term $I_{S(ff)}$, the controllers 730, 830 should reduce the feedforward current to compensate for the modeling error when the temperature error is negative, and to boost up the inverter power when the temperature error is positive. The positive limit of the integrator in the PI controller should be set to zero in order not to accumulate the temperature error when the feedback temperature is lower than the temperature reference. In other words, when the error is positive with the initial integrator value of zero, the amount of current boost according to this algorithm is determined by the controller gain $k_p$ and the temperature error as shown in equation (23).

$$I_{S(max)} = I_{S(ff)} + I_{S(fb)} \quad (23)$$
$$= I_{S(ff)} + k_p(T^*_j - T_{j(Q)}) \text{ when } T^*_j > T_{j(Q)}$$
$$= I_{S(ff)} + k_p(T^*_s - T_s)$$

Figure 10:
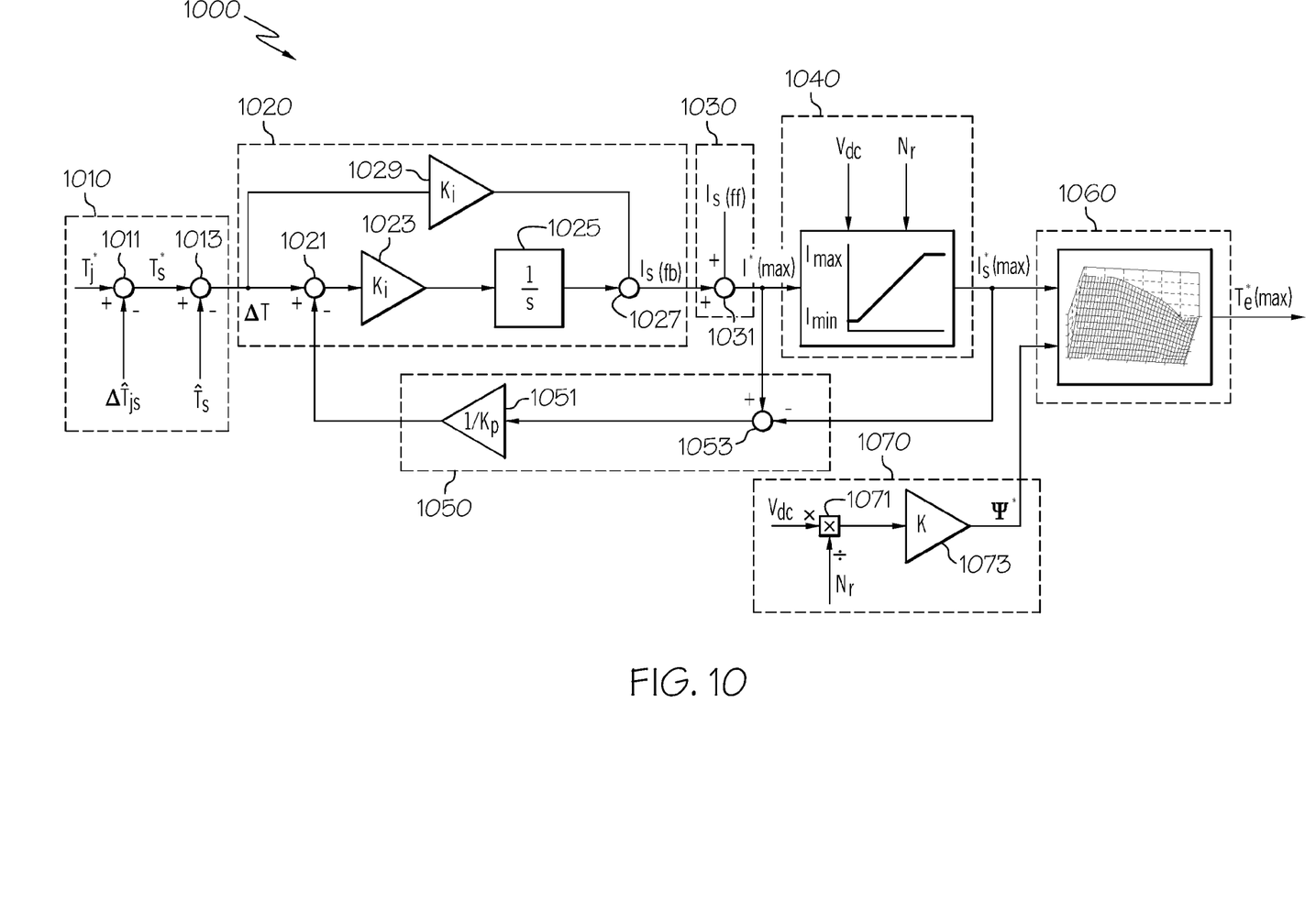
FIG. 10 is a block diagram illustrating an exemplary PIM temperature limiting controller 1000 in accordance with an embodiment.

FIG. 10 is a block diagram illustrating an exemplary PIM temperature limiting controller 1000 in accordance with an embodiment of the invention. The controller 1000 suitably includes a temperature error block 1010, a PI controller block 1020, a feedforward block 1030, a limiting block 1040, a discrepancy collection block 1050, a maximum torque block 1060, and an operating condition block 1070.

The temperature error block 1010 includes difference junctions 1011 and 1013. Difference junction 1011 subtracts the estimated temperature difference $\Delta \hat{T}_j$, between the junction and the substrate from the temperature reference $T^*_j$ to obtain the substrate temperature reference $T^*_s$. Difference junction 1013 subtracts the estimated substrate temperature $\hat{T}_s$ from the substrate temperature reference $T^*_s$ to obtain the substrate temperature error $\Delta T$, which is provided as input to the PI controller block 1020. The estimated substrate temperature $\hat{T}_s$ and the estimated junction temperature $\hat{T}_j$ may be obtained based on equations (5)-(12).

Using the estimated substrate temperature $\hat{T}_s$ and the estimated junction temperature $\hat{T}_j$ as illustrated in FIG. 10 represents quasi-open-loop control. In alternative embodiments, the measured substrate temperature $T_s$ and the measured junction temperature $T_j$ may be used.

The PI controller block 1020 includes difference junction 1021, gain blocks 1023 and 1029, integrator block 1025, and summing junction 1027, which implement the PI controller that was described above. The current reference $I_{S(fb)}$ for the current boost is the output of the PI controller block 1020.

The feedforward block 1030 calculates the feedforward current term $I_{S(ff)}$ and adds it to the current reference $I_{S(fb)}$ at summing junction 1031 to obtain the initial maximum allowable current $I^{}_{S(max)}$. The limiting block 1040 limits the initial maximum allowable current $I^{}_{S(max)}$ of the feedforward block 1030 based on the maximum or minimum required for the system operation to obtain the maximum allowable current $I^*_{S(max)}$. As was explained above, the maximum allowable current $I^*_{S(max)}$ is one of the inputs to the maximum torque block 1060.

The discrepancy collection block 1050 collects the difference between the feedforward block 1030 and the limiting block 1040 at difference junction 1053, then reduces it by a factor of $1/k_p$ at gain block 1051. The reduced difference is then fed back to the PI controller block 1020 at difference junction 1021 in order to avoid the wind-up phenomena.

The operating condition block 1070 obtains the ratio of the DC bus voltage $V_{DC}$ and the operating speed $N_R$ at block 1071, then multiplies the ratio by a factor of K at gain block 1073 to obtain the maximum allowable flux $\Psi^*_{S(max)}$. As was explained above, the maximum allowable flux $\Psi^*_{S(max)}$ is the other input to the maximum torque block 1060. Based on the maximum allowable current $I^*_{S(max)}$ and the maximum allowable flux $\Psi^*_{S(max)}$, the maximum torque block 1060 generates the maximum allowable torque $T^*_{e(max)}$. The maximum allowable torque $T^*_{e(max)}$ may then be sent to the motor control algorithm to limit the torque command to suppress the IGBT junction temperature to be below the temperature reference or limit.

Figure 11:
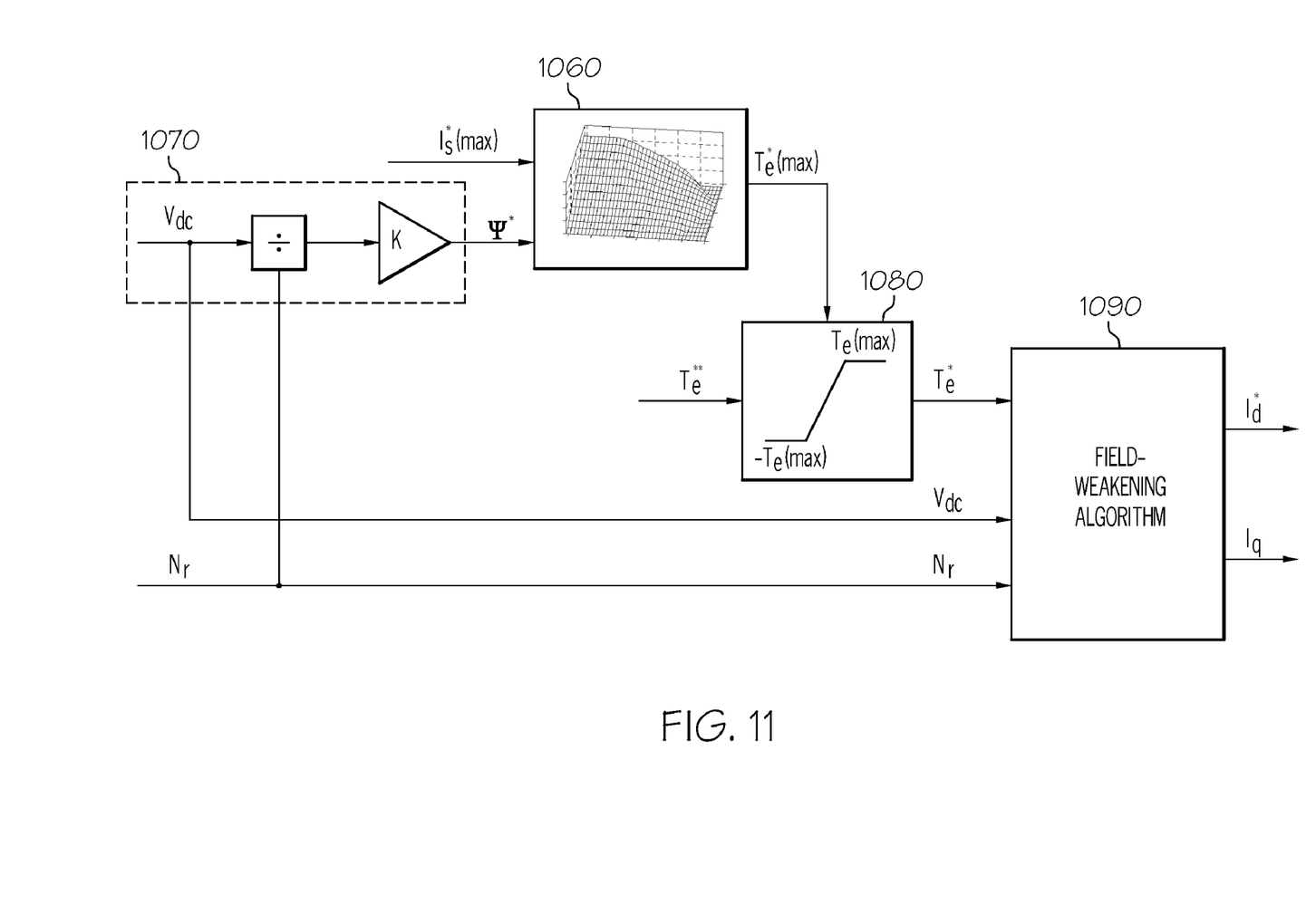
FIG. 11 is a block diagram illustrating an example of limiting the torque command based on the output of FIG. 10 in accordance with an embodiment.

FIG. 11 is a block diagram illustrating an example of limiting the torque command based on the output of FIG. 10 in accordance with an example embodiment. In FIG. 11, the maximum torque block 1060 and the operating condition block 1070 are shown as in FIG. 10. The torque limiting block 1080 uses the maximum allowable torque $T^*_{e(max)}$ to limit the initial torque command $T^{**}_e$ and produce the torque command $T^*_e$. The field weakening algorithm 1090 is then used to generate a current command from the limited torque at a particular speed ($N_r$) and the DC bus voltage $V_{DC}$. In the illustrated embodiment, the current command includes two commands, $I^*_d$ and $I^*_q$, to control current within an inverter such as the PIM 200 of FIG. 2.

While at least one example embodiment has been presented in the foregoing detailed description, it should be appreciated that a vast number of variations exist. It should also be appreciated that the example embodiment or example embodiments are not intended to limit the scope, applicability, or configuration of the invention in any way. Rather, the foregoing detailed description will provide those skilled in the art with a convenient road map for implementing the inventive aspects that may be found in at least one embodiment. The subject matter of the invention includes all combinations and subcombinations of the various elements, features, functions and/or properties disclosed in the example embodiments. It should be further understood that various changes can be made in the function and arrangement of elements without departing from the scope of the invention as defined in the appended claims and the legal equivalents thereof.

What is claimed is:

1. A method comprising:
generating a maximum allowable current $I^*_{S(max)}$ for a motor based on a temperature difference between a temperature reference $T^*$ of a power inverter module and a semiconductor device temperature T of the power inverter module;
generating a maximum allowable torque $T^*_{e(max)}$ based on the maximum allowable current $I^*_{S(max)}$ and a maximum allowable flux $\Psi^*_{S(max)}$; and
using the maximum allowable torque $T^*_{e(max)}$ to limit a torque command $T_e^*$ in order to suppress the semiconductor device temperature T to below the temperature reference $T^*$.

2. The method of claim 1, wherein generating the maximum allowable current $I^*_{S(max)}$ comprises calculating the semiconductor device temperature T of the power inverter module.

3. The method of claim 2, wherein calculating the semiconductor device temperature T of the power inverter module comprises estimating a junction temperature $T_j$ of the power inverter module using at least a coolant temperature $T_c$ of the power inverter module.

4. The method of claim 3, wherein calculating the semiconductor device temperature T of the power inverter module further comprises estimating the junction temperature $T_j$ using a total power dissipation $P_d$ of the power inverter module.

5. The method of claim 1, wherein generating the maximum allowable current $I^*_{S(max)}$ comprises measuring the semiconductor device temperature T of the power inverter module.

6. The method of claim 5, wherein measuring the semiconductor device temperature T of the power inverter module comprises:
measuring the junction temperature $T_j$ of the power inverter module; and
controlling the junction temperature $T_j$ of the power inverter module by adjusting a self dissipation $P_{dQ}$ of a transistor of the power inverter module and by adjusting a total power dissipation $P_d$ of the power inverter module.

7. The method of claim 5, wherein measuring the semiconductor device temperature T of the power inverter module comprises measuring a substrate temperature $T_s$ of the power inverter module.

8. A controller operable to limit a temperature of a power inverter module in an automotive system, the controller comprising:

a temperature error circuit operable to provide a difference between a temperature reference for the power inverter module and a temperature of the power inverter module at an output of the temperature error circuit; and a Proportional Integrator (PI) controller circuit coupled to the output of the temperature error circuit, the PI controller circuit operable to provide a current reference $I_{s(fb)}$ based at least in part upon the difference, wherein the PI controller circuit has a transfer function C(s) that is substantially expressed as $$C(s) = k_p + \frac{k_i}{s},$$

where and $k_p$ and $k_i$ comprise gains of the PI controller circuit.

9. The controller of claim 8, the temperature of the power inverter module comprising a measured temperature of the power inverter module.

10. The controller of claim 9, the measured temperature of the power inverter module comprising a measured temperature of a junction of the power inverter module.

11. The controller of claim 8, the temperature of the power inverter module comprising an estimated temperature of the power inverter module.

12. The controller of claim 11, the estimated temperature of the power inverter module comprising an estimated substrate temperature of the power inverter module.

13. The controller of claim 8, further comprising a feedforward circuit coupled to an output of the PI controller circuit, the feedforward circuit operable to output an initial maximum allowable current $I^{**}_{S(max)}$ based on the addition of a feedforward current term $I_{S(ff)}$ to the current reference $I_{S(fb)}$.

14. The controller of claim 13, further comprising a limiting circuit coupled to an output of the feedforward circuit, the limiting circuit operable to output the maximum allowable current $I^{*}_{S(max)}$ by limiting the initial maximum allowable current $I^{**}_{S(max)}$ based on a maximum or a minimum that is required for operation of the automotive system.

15. The controller of claim 14, further comprising a discrepancy collection circuit coupled to an output of the feedforward circuit, an output of the limiting circuit, and to an input of the PI controller circuit, the discrepancy collection circuit operable to calculate a difference between the maximum allowable current $I^{*}_{S(max)}$ and the initial maximum allowable current $I^{**}_{S(max)}$, then reduce the difference by a factor of $1/k_p$, where $k_p$ comprises a gain of the PI controller circuit.

16. An automotive system comprising:
a motor;
a power inverter module coupled to the motor;
a controller coupled to the motor, the controller operable to generate a maximum allowable current $I^{*}_{S(max)}$ for the motor based on a difference between a temperature limit T* for the power inverter module and a semiconductor device temperature T of the power inverter module; and
a torque limiter coupled to the controller, the torque limiter operable to:
generate a maximum allowable torque $T^{*}_{e(max)}$ based on the maximum allowable current $I^{*}_{S(max)}$ and a maximum allowable flux $\Psi^{*}_{S(max)}$; and
limit a torque command for the motor using the maximum allowable torque $T^{*}_{e(max)}$ in order to suppress the semiconductor device temperature T to below the temperature reference T*.

17. The automotive system of claim 16, wherein the temperature limit T* for the power inverter module comprises a junction temperature limit $T^{*}_j$ and the semiconductor device temperature T of the power inverter module comprises an estimated junction temperature $\hat{T}_j$.

18. The automotive system of claim 16, wherein the temperature limit T* for the power inverter module comprises a junction temperature limit $T^{*}_j$ and the semiconductor device temperature T of the power inverter module comprises a measured junction temperature $T_j$.

19. The automotive system of claim 16, wherein the temperature limit T* for the power inverter module comprises a substrate temperature limit $T^{*}_s$ and the semiconductor device temperature T of the power inverter module comprises a substrate temperature $T_s$.

* * * * *